M. DELUME.
CINEMA AND ANALOGOUS PROJECTION APPARATUS.
APPLICATION FILED JAN. 21, 1919.
1,417,807.
Patented May 30, 1922.
2 SHEETS—SHEET 1.
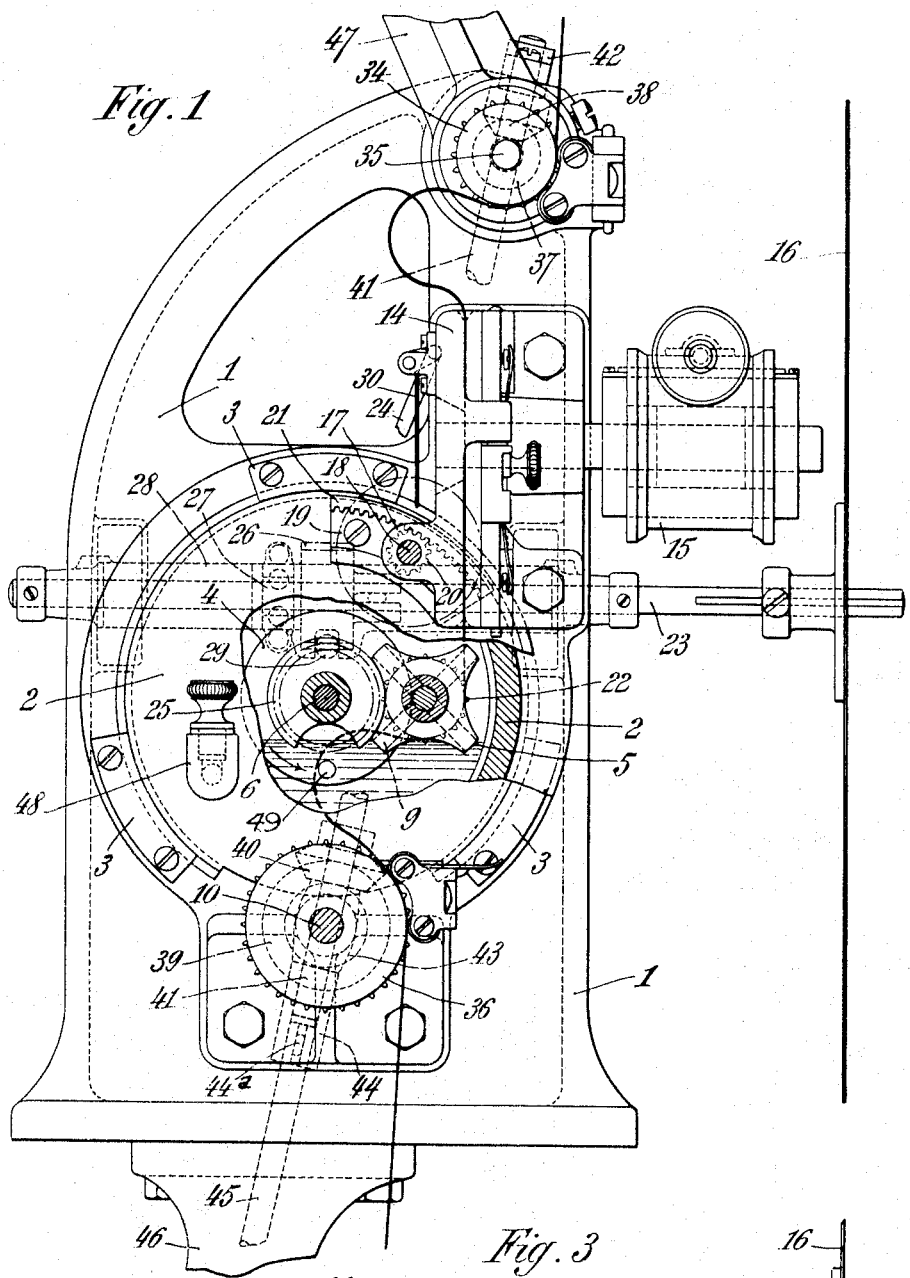
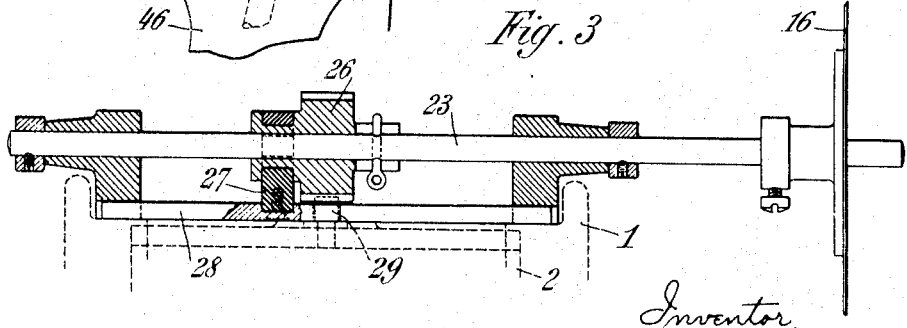

UNITED STATES PATENT OFFICE.

MARCEL DELUME, OF PARIS, FRANCE, ASSIGNOR TO SOCIÉTÉ D'EXPLOITATION DES BREVETS DUPUIS, OF PARIS, FRANCE.

CINEMA AND ANALOGOUS PROJECTION APPARATUS.

1,417,807. Specification of Letters Patent. Patented May 30, 1922.

Application filed January 21, 1919. Serial No. 272,309.

*To all whom it may concern:*

Be it known that I, MARCEL DELUME, citizen of the Republic of France, and resident of 20 Rue Orfila, Paris, in the said Republic, have invented certain new and useful Improvements in Cinema and Analogous Projection Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention comprises improvements in cinema and analogous projection apparatus and relates to an arrangement for the registration or framing of the image in such projectors, the improvements being applicable to projection apparatus in which the optical axis is fixed, that is to say, in which the source of light, the condenser, the gate and the objective occupy positions which are always situated strictly along the same axis.

In most of the projectors now in use, the registration of the image upon the screen is obtained by the simultaneous displacement of the gate and of the objective parallel with the path of the film. In such cases, the source of light and the condenser being fixed, it is evident that the light instead of being concentrated only upon the image, is dispersed over an appreciably larger surface in order that the image may retain its brightness in spite of the displacements. This results in greater expense for lighting besides the inconvenience resulting from the displacement of the projection on the screen.

Some arrangements permit of obviating these drawbacks. In certain apparatus, the lantern carrying the source of light and the condenser are moved in company with the gate and the objective. This arrangement, while permitting of preserving a straight line optical axis retains the drawback consisting in the disagreeable displacement of the image on the screen. It involves, moreover, considerable complication. In more elaborate arrangements the greater part of the driving mechanism, comprising the Geneva gear, the sprocket drum, the driving shaft and the obturator, is displaced parallel to the path of the film, that is to say vertically. While this arrangement gives the desired result, it necessitates the mounting of all of the mechanism in question upon a slider which must be adjusted on the apparatus and the weight of which is equilibrated by a spring. This results in a very costly construction and, moreover, having regard to the fact that the vertical type of apparatus is practically the only one in use, the slightest play or movement of the slider due to vibrations, results in displacements of the image during the running of the projector. Finally, in apparatus driven by a motor, as the driving shaft is subjected to an appreciable displacement it is impossible to arrange the motor in any position whatever, owing to the great variations in the length of the driving belt which are required according to the arrangement in question. There are yet other arrangements which have been suggested but these are not steady enough to permit of their practicability.

The arrangement in accordance with the present invention possesses none of the drawbacks above described and at the same time permits of preserving a strictly fixed optical axis.

The casing of the Geneva gear mechanism is of cylindrical shape and is adjustably mounted in the frame by means of a frictional mounting. For example, it is held or gripped by three sectors fixed upon the frame and these sectors simply hold the casing in place while permitting it to rotate about its axis.

The rotation of the casing is effected by means of a pinion meshing with a sector fixed or formed on the Geneva gear casing, the teeth of the sector being preferably formed on the interior of the sector in order that the movement of the hand operating the pinion may be in the same direction as the displacement of the image, so that the operator runs no risk of making an error in the direction of movement which will result from the turning of say, a knurled knob fixed on the extremity of the spindle of the pinion. The spindle aforesaid is supported in two bearings provided on the plate in which the gate is provided.

It is apparent that, if the toothed pinion be turned by hand, the casing will be turned around its axis. The Geneva gear which is mounted in the drum eccentrically to the axis of the driving shaft is carried round by the drum as also is the sprocket drum which feeds the film and which is mounted on the same spindle as the Geneva gear. Consequently the film will be displaced in one direction or the other according to the direction of the movement of adjustment. It is possible, therefore, to accurately register the image on the axis of the gate without displacement of any of the parts on the driving shaft.

The displacement of the Geneva gear around the axis of the driving shaft has the effect of advancing or retarding the moment at which a striker or finger fixed upon the driving plate engages in one of the grooves of the Geneva gear. The result is, therefore, that the displacement of the film is also advanced or retarded. Consequently, if the obturator were in a relatively invariable position, the obturation would commence too soon or too late in relation to the displacement of the image. Or it would be necessary for the obturation to last for a longer period and this would occasion an appreciable loss of light. To avoid this, the driving of the obturator is effected by means of helical gears the teeth of which are set at 45°. The helical pinion on the driving shaft is fixed to that shaft but the helical pinion on the obturator shaft is arranged so that, while it must turn with its shaft, it can be shifted along the same. For shifting the pinion, a collar is provided thereon and is secured to a slider movable in two guides. The moving of this slider is effected by a finger fixed on the cover of the casing of the Geneva gear mechanism. This finger could be replaced by a toothed pinion of the same effective diameter as the helical pinions, in which case the slider would be formed with rack teeth.

It will, therefore, be understood that under these conditions, if the casing be turned through a certain angle, so that the Geneva gear is carried around the axis of the driving shaft, the helical pinion mounted on the obturator spindle will be shifted along that spindle; owing to the teeth being inclined at 45°, the shifting of the pinion brings about a turning movement thereof through an angle equal to the angle through which the casing is turned, and the obturator is therefore turned through the same angle. Consequently the obturation will always take place at the desired moment in relation to the feeding of the film.

The accompanying drawings illustrate a cinema projector comprising a Geneva gear mechanism, the said projector being fitted with the present improvements.

Figure 1 is a side elevation of the apparatus, the cover of the casing of the Geneva gear mechanism and other parts being partially removed for sake of clearness.

Figure 3 is a horizontal section showing the details of the arrangement which serves for giving the obturator the same angular displacement as the casing of the Maltese cross mechanism.

Figure 2:
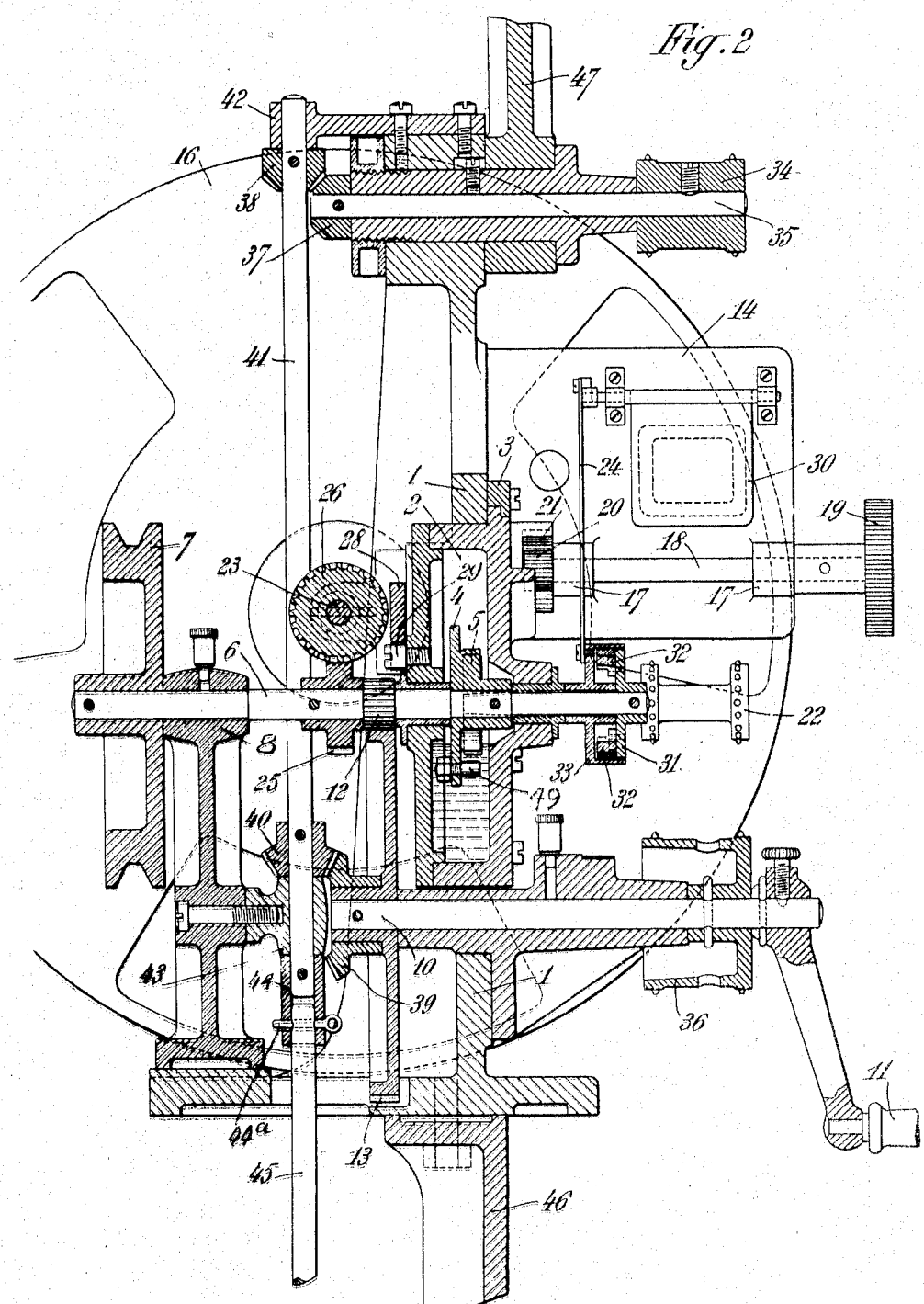
Figure 2 is a front elevation, partly in section, the plane of the section passing through the axis of the driving shaft.

The apparatus consists of a framing 1 in which the casing 2 of the Geneva gear mechanism is frictionally held so as to be adjustable circularly, the holding means consisting of three sectors 3. The plate 4 serving to drive the Geneva gear 5 is mounted upon the driving shaft 6 carrying the flywheel 7, and this shaft turns in a bearing upon the wall of the casing 2 and in a support 8 mounted on the framing 1. As usual this plate 4 carries a striker 49 which comes into engagement with the grooves 9 of the Geneva gear for revolving the latter. The shaft 6 is geared with the shaft 10 by pinions 12 and 13, and the shaft 10 is fitted with a crank handle 11.

The gate 14, the objective 15 and the obturator 16 are fixedly situated along the same axis as the condenser, through the medium of which the source of light illuminates the image.

Two bearings 17 formed upon the gate 14 carry a shaft 18 terminated by a knurled knob 19 for turning the shaft 18 by hand. Upon the shaft 18 is keyed a pinion 20 which meshes with teeth formed upon the interior of a sector 21 fixed upon the casing 2 of the Geneva gear mechanism. By turning the pinion 20 to any desired extent, there is imparted to the Geneva gear 5 and to the sprocket drum 22 on the same spindle a circular movement of translation which brings about a raising or lowering of the film in such manner as to effect accurate framing or registration.

The mechanism for producing a corresponding adjustment of the angular position of the obturator will now be described. The shaft 23 upon which is keyed the obturator 16 is driven from the shaft 6 through the medium of two pinions 25 and 26 having spiral or helical teeth, the said teeth having an inclination of 45°. The pinion 26 is mounted upon the shaft of the obturator so that, while it must turn therewith, the said pinion 26 is capable of being shifted along such shaft. The pinion 26 is formed with a grooved part or extension which is engaged by a collar or ring 27 secured to a rule or slider 28 movable in two guides. A finger or projection 29 carried by the cover of the casing 2 of the Geneva gear mechanism is engaged in a notch in the slider 28 and produces a movement of the latter to the right or the left according to whether the casing 2 be turned in one direction or the other. As the teeth of the pinions 25 and 26 are inclined at 45°, the longitudinal displacement of the slider 28 and of the pinion 26 produces a turning movement of the pinion 26 and therefore the shaft of the obturator is turned through an angle precisely equal to the angle through which the casing 2 is turned. It follows that the obturation will always take place at the desired moment in relation to the displacement of the image or film, as has already been said.

A shutter 30 is placed in front of the gate 14 and is automatically operated when the speed is sufficient for opening the gate and is closed when the speed diminishes to such an extent that there may be a danger of fire. For producing these opening and closing movements, a disc 31 is keyed upon the shaft 6, and upon one of its faces, near to the periphery, are mounted two weights 32 which can pivot freely about pivots at one of their extremities. Each of these weights is fitted with a friction surface of leather or analogous material, so that when the centrifugal force causes the weights to fly outwards, the said surfaces come against the inner periphery of a drum 33 freely mounted on the shaft 6 and frictionally turn the said drum. A crank pin or the like carried by the drum is connected by a rod 24 to a crank arm fixed on the pivotal axis of the shutter 30. Therefore, when the speed of the shaft 6 is sufficient, the weights 32 are flung outwards by the centrifugal force against the drum 33 and turn it, so causing the shutter to pivot in the direction for opening. When the speed diminishes below a predetermined limit, the weights fail to turn the drum 33 and the shutter falls to the closed position under its own weight.

This movable shutter and its operating mechanism do not constitute part of the present invention. The same may be said of other parts of the apparatus which will be hereinafter described, the same being alluded to simply for the purpose of giving a comprehensive description of the machine shown in the drawings.

The upper sprocket drum 34 is keyed to a shaft 35 and the lower sprocket drum 36 is keyed to the shaft 10. These drums are driven by means of bevel pinions 37 and 39 on their shafts gearing with similar pinions 38 and 40 fixed upon a vertical shaft 41 revolving in an upper bearing 42 and in a sleeve 43 fixed to the support 8. At the lower extremity of the shaft 41 is pinned a coupling sleeve 44 in which is secured by a pin 44ª the extreme end of a shaft 45 forming a prolongation of the shaft 41. Shaft 45 drives through bevel gearing the spindle of the winding spool, but as this winding spool presents no novel characteristic no more need be said about it except that its spindle is mounted in a support 46 fixed to the framing.

Another support 47 carries the spindle of the upper spool which also possesses no particular characteristic and this support may swing around the shaft 35 in order to facilitate the packing of the apparatus and make it less cumbrous.

48 is the orifice through which the lubricating oil is introduced into the casing 2 of the Maltese cross mechanism.

I claim—

1. A framing mechanism for moving picture machines comprising a driving shaft, a casing adjustable around said shaft, film driving mechanism in said casing adjustable by the adjustment of said casing to adjust the framing, a helical gear on said shaft, an obturator shaft, a helical gear on the obturator shaft engaging the first mentioned gear, and means on said casing to adjust the obturator shaft and its helical gear relatively to the gear on the driving shaft, whereby the obturator and framing adjustments are simultaneously effected.

2. An arrangement for framing the image in cinema and analogous projectors comprising a driving shaft, a casing and a film driving mechanism therein, in combination with automatic obturator regulating mechanism comprising a pinion having spiral or helical teeth inclined at 45° keyed upon the driving shaft of the apparatus, an obturator and its spindle, a similar pinion keyed upon the obturator spindle but slidable thereon longitudinally, a collar engaging the latter pinion, a slider to which the collar is fixed, and means actuated by the movement of casing for displacing said slider to the right or to the left whereby the framing is effected.

3. In framing mechanism for cinema projection apparatus, a housing, a casing rotatable therein, a driving shaft entering said casing, a Geneva gear in said casing driven by said shaft, a rotatable obturator, an obturator shaft, a helical pinion slidable on said shaft, a helical gear on the driving shaft and meshing with said pinion, a collar engaging the sliding pinion, a slider fixed to said collar, means on said casing to shift said slider and thereby the collar and pinion, and means to turn the casing for framing.

In testimony that I claim the foregoing as my invention, I have signed my name.

MARCEL DELUME.